US008282076B2

(12) United States Patent
Takahashi

(10) Patent No.: US 8,282,076 B2
(45) Date of Patent: Oct. 9, 2012

(54) OPENING/CLOSING DEVICE FOR MANHOLE COVER

(75) Inventor: Akio Takahashi, Iwate (JP)

(73) Assignee: Takasyu Co., Ltd., Osyu-shi (JP)

( * ) Notice: Subject to any disclaimer, the term of this patent is extended or adjusted under 35 U.S.C. 154(b) by 479 days.

(21) Appl. No.: 12/227,254

(22) PCT Filed: Mar. 5, 2007

(86) PCT No.: PCT/JP2007/054176
§ 371 (c)(1),
(2), (4) Date: Jan. 5, 2009

(87) PCT Pub. No.: WO2007/132582
PCT Pub. Date: Nov. 22, 2007

(65) Prior Publication Data

US 2009/0101876 A1 Apr. 23, 2009

(30) Foreign Application Priority Data

May 15, 2006 (JP) ................................ 2006-135344

(51) Int. Cl.

| | |
|---|---|
| ***B60P 1/14*** | (2006.01) |
| ***B60P 1/22*** | (2006.01) |
| ***B66F 3/08*** | (2006.01) |
| ***B66F 3/00*** | (2006.01) |
| ***B66F 7/10*** | (2006.01) |
| ***B66F 7/02*** | (2006.01) |
| ***B66F 3/24*** | (2006.01) |
| ***A62B 3/00*** | (2006.01) |
| ***E21D 15/44*** | (2006.01) |

(52) U.S. Cl. ....... 254/14; 254/13; 254/133 R; 254/93 R; 254/89 H; 254/4 B

(58) Field of Classification Search .................... 254/14, 254/13, 113, 131, 120, 124, 133 R, 93 R, 254/89 H, 4 B, 8 R, 8 B, 2 B
See application file for complete search history.

(56) References Cited

U.S. PATENT DOCUMENTS

| | | | | |
|---|---|---|---|---|
| 4,181,290 | A * | 1/1980 | Affolter | 254/124 |
| 4,991,893 | A * | 2/1991 | Gordon et al. | 294/17 |
| 5,249,703 | A * | 10/1993 | Karp | 220/719 |
| 6,247,307 | B1 * | 6/2001 | Hung | 60/479 |
| 6,820,861 | B2 * | 11/2004 | Bruzek | 254/93 H |
| 2005/0051549 | A1 * | 3/2005 | Nelson | 220/23.83 |

FOREIGN PATENT DOCUMENTS

| | | |
|---|---|---|
| JP | 2914633 | 7/1999 |

(Continued)

*Primary Examiner* — Monica Carter
*Assistant Examiner* — Seahee Yoon
(74) *Attorney, Agent, or Firm* — Jordan and Hamburg LLP

(57) ABSTRACT

An opening and closing apparatus of a manhole cover has a simple structure and by which opening and closing operation of a cover can be performed safely by a worker alone. An opening and closing apparatus of a manhole cover has such a configuration that the manhole cover is openably and closably coupled to an opening portion of a supporting frame via a rotational joining portion. A hydraulic jack in which a plunger pump is driven by a manual lever raises a ram and the ram lowers due to releasing of an oil returning valve attached on the supporting frame near the rotational joining portion such that the hydraulic jack is rotatable at a lower end portion thereof, and the hydraulic jack and an engagement member fixed attachably to and detachably from the manhole cover are coupled to each other by a pulling member.

8 Claims, 7 Drawing Sheets

FOREIGN PATENT DOCUMENTS

| | | | |
|---|---|---|---|
| JP | 11-323984 | | 11/1999 |
| JP | 2001-020308 | | 1/2001 |
| JP | 3299729 | | 7/2002 |
| JP | 2003-252578 | | 9/2003 |
| JP | 3943414 | B2 * | 7/2007 |

* cited by examiner

PRIOR ART

PRIOR ART

PRIOR ART

PRIOR ART

OPENING/CLOSING DEVICE FOR MANHOLE COVER

BACKGROUND OF THE INVENTION

1. Field of the Invention

The present invention relates to an opening and closing apparatus of a manhole cover provided on a manhole of an multipurpose underground conduit storing water and sewage pipes, electric cables, telephone cables, and the like collectively, and the like.

2. Description of the Related Art

As a manhole cover provided on a manhole of an multipurpose underground conduit, there are a concrete cover and a cast-iron cover, where the cast-iron cover has been generally used as a manhole cover provided on a place where opening and closing operations are often performed or a place where an area of an opening portion is large. However, the gross weight of the cast-iron cover depends on a shape or a size thereof, but it reaches 600 to 800 kg, so that it is difficult to utilize human power to open and close the cover, a heavy equipment such as a track crane or an exclusive opening and closing apparatus must be used for opening and closing the cover, and such an accident as dropping the cover into a manhole may happen due to erroneous opening and closing operation.

In order to solve such conventional problems, the present inventor has developed such an opening and closing apparatus of a manhole cover as shown in FIG. 1 to FIG. 10, FIG. 13, and FIG. 14 (Japanese Patent No. 2914633 and Japanese Patent No. 3299729). The opening and closing apparatus, as shown in these figures, is an opening and closing apparatus of a manhole cover in which a manhole cover 3 is rotatably attached on an opening portion 1A of a doughnut-shaped supporting frame 1 via a rotational joining portion 2, a hydraulic jack 7 in which a plunger pump 5 is driven by an operation lever 4 to raise a ram 6 and an oil returning valve 34 is released, to lower the ram 6 is provided near the rotational joining portion 2 of the supporting frame 1 rotatably by a mounting member 8 provided on a lower end portion of the hydraulic jack 7, and the hydraulic jack 7 and an engagement member 9 fixed attachably to and detachably from the manhole cover 3 are coupled to each other by a pulling member 10.

Patent Literature 1: Japanese Patent No. 2914633

Patent Literature 2: Japanese Patent No. 3299729

In the opening and closing apparatus of the manhole cover thus configured, there is such an advantage that even a heavy cover can be easily opened and closed by a worker alone in a short time. In the opening and closing apparatus, however, there are structural problems especially on an apparatus for rotating the manhole cover 3 to open and close the opening portion 1A of the supporting frame 1, that is, the hydraulic jack 7 which is a driving source for performing opening and closing. However, an opening and closing apparatus of a manhole cover that is further excellent in safety could have been provided by solving these problems.

An oil returning valve 34, a screw valve chamber 35, an outlet portion 36, and a return port 37 is configured as shown in FIG. 13 and FIG. 14, that is, it is configured to change from a state shown in FIG. 13 in which a screw valve 38 screwed so as to be capable of advancing and retreating within the screw valve chamber 35 has advanced and the oil returning valve 34 has closed to a state shown in FIG. 14 in which the oil returning valve 34 is released by rotating the screw valve 38 to retreat the same so that the oil return path runs on in one line manner.

Specifically, the oil returning valve 34 is configured to be closed by supporting a ball 34A at a distal end of the screw valve 38 attached by screwing such that the ball 34A can move along the inside of the screw valve chamber 35 to come in pressure contact with a seat surface 34B and to be released or opened by loosening (retreating) the screw valve 38 to separate the ball 34A from the seat surface 34B.

An operation for releasing the oil returning valve 34 is required when, after work in the manhole has been finished, the manhole cover 3 is going to be closed from a state shown by solid line in FIG. 9, that is, a state shown in FIG. 10 in which the manhole cover 3 has been fully opened. That is, the screw valve 38 is loosened from a state shown in FIG. 13 and moved leftward in FIG. 13, and after the oil returning valve 34 is released as shown in FIG. 14, the manhole cover 3 is pushed out rightward in FIG. 9 and FIG. 10 in a state shown by solid line in FIG. 9 and shown in FIG. 10 by hand, and rotated about the rotational joining portion 2 to be put into a state shown by dashed line in FIG. 9.

When the oil returning valve 34 has been released and the manhole cover 3 has been moved to a state shown by dashed line in FIG. 9, the manhole cover 3 is subjected to force in a direction (rightward) in which the manhole cover 3 falls rightward due to its own weight. As a result, the manhole cover 3 rotates about the rotational joining portion 2 in a closing direction shown in FIG. 8 from a state shown by dashed line in FIG. 9, and further rotates at once into a state shown in FIG. 7 in which the manhole cover 3 fully closes the opening portion 1A of the supporting frame 1.

Then, in order to prevent hydraulic oil from rapidly returning through the oil returning valve 34, the screw valve chamber 35, the outlet portion 36, and the return port 37, a plurality of structures in which a hole diameter of the return port 37 was made further smaller than that of a conventional return port shown in FIG. 13 and FIG. 14 were manufactured, and an experiment on a relationship between the hole diameter of the return port 37 and a speed at a time when the manhole cover 3 was closed was repeated.

It was expected that resistance of oil flowing inside the return port 37 was increased by making the hole diameter of the return port 37 small so that a movement flow rate of the hydraulic oil slowed down and the manhole cover 3 slowly closed. The manhole cover 3 gently rotated at the beginning of the experiment due to that the hole diameter of the return port 37 was made small, but the return port 37 was clogged when used for a long time due to oil degradation, dust, contamination, or the like, which caused such a problem that the hydraulic jack 7 did not work.

The present invention has been made to solve such a conventional problem as described above, and an object thereof is to provide an apparatus in which a detour orifice for adjusting a returning flow rate of hydraulic oil is provided in an oil returning path through which the hydraulic oil returns from a hydraulic pressure chamber on the side of the ram to a tank so that a returning speed of the hydraulic oil returning to the tank from the pressure oil chamber on the side of the ram is adjusted to be slowed down as much as possible, so that a manhole cover slowly rotates and an opening portion of a supporting frame can close gently.

BRIEF SUMMARY OF THE INVENTION

In order to achieve the above object, according to the present invention, there is provided an opening and closing apparatus of a manhole cover where a manhole cover is rotatably attached to an opening portion of a supporting frame via a rotational joining portion, a hydraulic jack where a ram is raised by reciprocating movement of a plunger and the ram is lowered by release of an oil returning valve is provided at a portion of the supporting frame positioned near the rotational joining portion such that the hydraulic jack is rotatable and is attachable and detachable at a lower end thereof, an upper end portion of the ram of the hydraulic jack and an engagement member provided on the manhole cover are coupled to each other by a pulling member, and the manhole cover is rotated about the rotational joining portion by moving the ram of the hydraulic jack up and down so that the opening portion of the supporting frame is opened and closed, wherein a rotating rate adjusting mechanism in which, when the opening portion of the supporting frame is closed, the manhole cover is slowly rotated is provided.

Since the opening and closing apparatus of a manhole cover according to the present invention has such a configuration as described above, a structure thereof is simple and the opening and closing apparatus can be provided inexpensively, and opening and closing operations of the manhole cover can be performed safely and easily by a worker alone. Since the diameter of the return port can be further enlarged, clogging caused by dust or the like does not occur for a long time so that maintenance is easy.

Further, there are such various effects that, since fitting portions of the supporting frame and the manhole cover comprise vertical surfaces and inclined surfaces, respectively, galling of the manhole cover with the supporting frame at an opening or closing time of the manhole cover does not occur so that the manhole cover rotates smoothly, and since a packing is attached on the inclined surface to ensure water cutoff performance, sealing effect is improved.

BEST MODE FOR CARRYING OUT THE INVENTION

Figure 1:
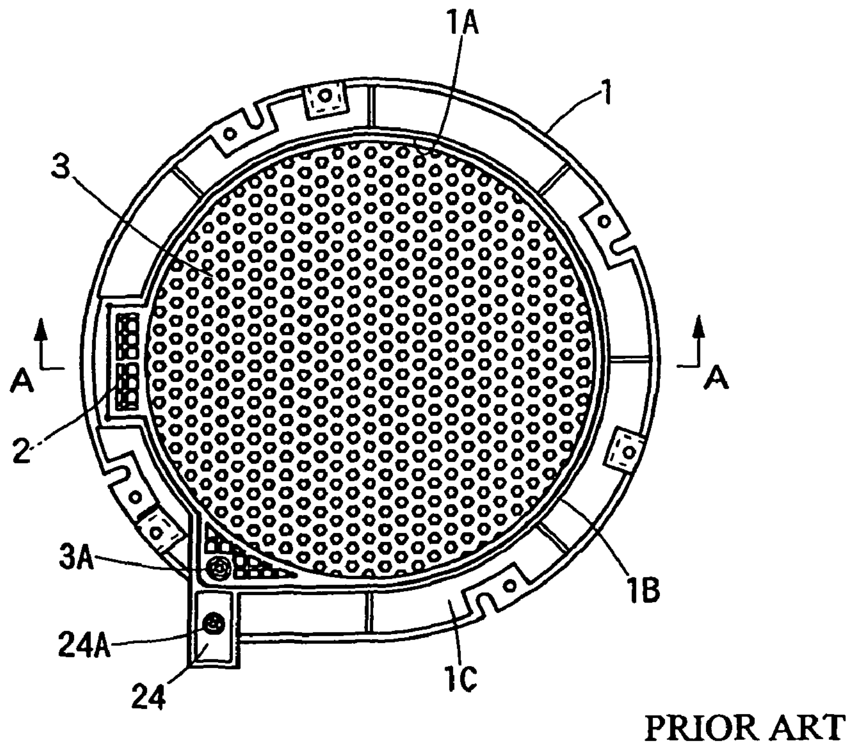
FIG. 1 is a plan view of a supporting frame of a manhole and a manhole cover which has closed an opening portion thereof.

An opening and closing apparatus of a manhole cover according to the present invention will be explained below in detail with reference to the drawings showing an embodiment thereof. Incidentally, since the opening and closing apparatus of a manhole cover according to the present invention includes the structurally-same portions as the conventional apparatus described above, explanation will be made while the same portions are attached with the same reference numerals, and a configuration of a portion which is an important portion of the present invention will be explained below in detail.

Figure 2:
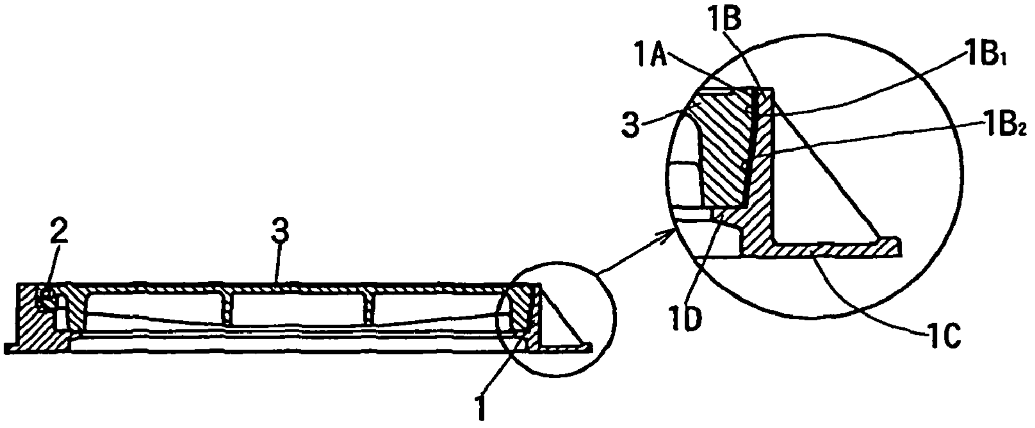
PRIOR ART FIG.2
FIG. 2 is a sectional view of the supporting frame and the manhole cover, taken along arrow line A-A in FIG. 1.
Figure 3:
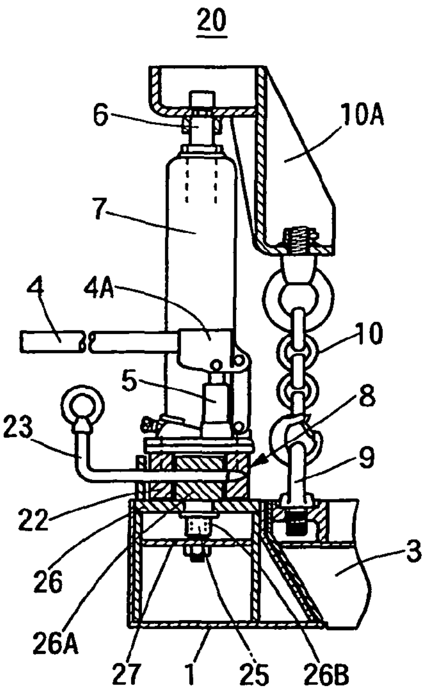
FIG. 3 is a partial cutaway side view of a state in which an opening and closing apparatus according to the present invention is installed on the supporting frame of the manhole and the manhole cover.
Figure 4:
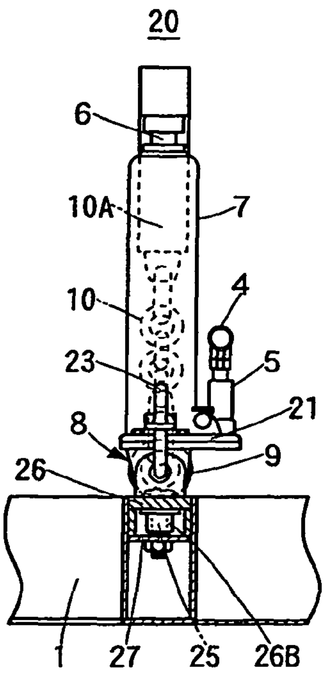
PRIOR ART FIG.4
FIG. 4 is a front view of the opening and closing apparatus shown in FIG. 3.
Figure 5:
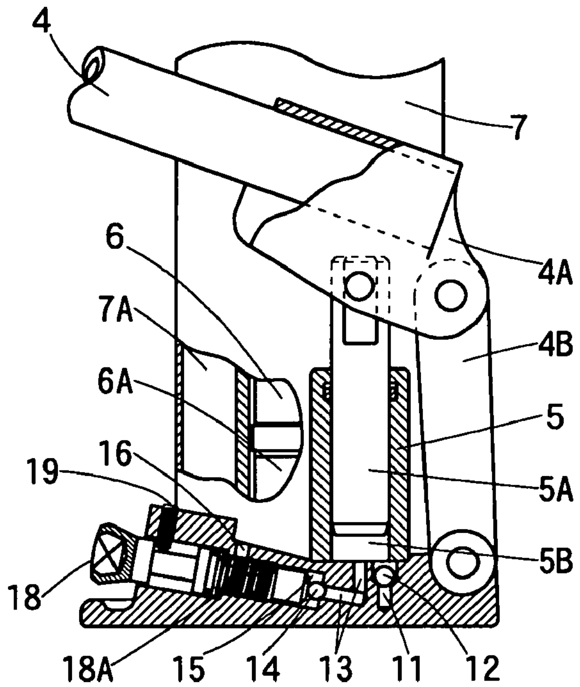
FIG. 5 is a side view of a partial cutaway enlarged and partial side view of the opening and closing apparatus.
Figure 6:
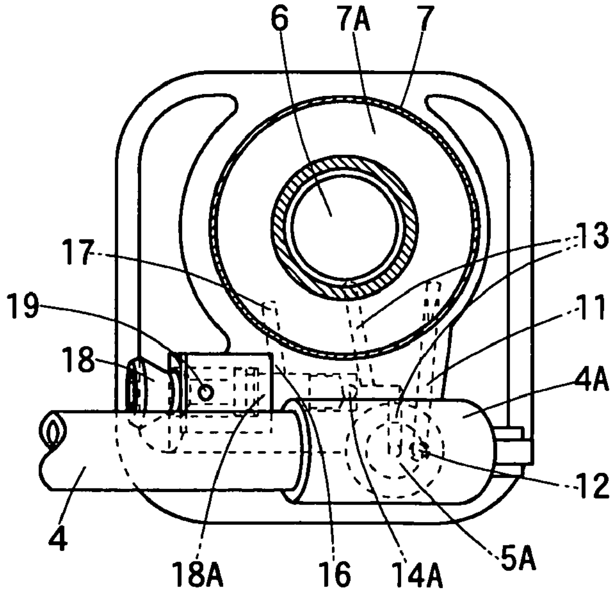
FIG. 6 is a partial cutaway plan view of the opening and closing apparatus in FIG. 5.

In FIG. 1 to FIG. 12, reference numeral 1 denotes a supporting frame with a circular opening portion 1A at its center, where the supporting frame 1 mainly comprises a vertically standing peripheral wall portion 1B with a predetermined height and a bottom wall portion 1C horizontally extending outward from an outer peripheral surface lower end of the peripheral wall portion 1B, and, as shown in FIG. 2, an inner peripheral surface of the peripheral wall portion 1B forming the central circular opening portion 1A comprises a vertical surface portion $1B_1$ extend downwardly from its upper end to a predetermined depth and a downward-inclined surface portion $1B_2$ positioned below the vertical surface portion $1B_1$ and gently inclined downward toward the center of the supporting frame 1, and an inward-flange-like supporting portion 1D horizontally projecting toward the center is formed integrally over all periphery at a lower end of the downward-inclined surface portion $1B_2$.

Reference numeral 3 denotes a manhole cover provided on the opening portion 1A of the supporting frame 1, where the manhole cover 3 is provided to be openable and closable via a rotational joining portion 2. Reference numeral 20 denotes an opening and closing apparatus of the manhole cover 3, and as shown in FIG. 3 to FIG. 6, the opening and closing apparatus 20 comprises a hydraulic jack 7 fixed on a base 21, a plunger pump 5 which pumps pressure oil to a cylinder of the hydraulic jack 7, a supporting arm 4A fixing an operation lever 4 of the plunger pump 5 in an inserting manner, a coupling member 10A fixed at an upper end of a ram 6 of the hydraulic jack 7, and a pulling member 10.

One end of the supporting arm 4A is rotatably mounted on an upper portion of a supporting column 4B provided at a position in front of the plunger pump 5, a middle portion thereof is attached on an upper end of the plunger 5A of the plunger pump 5 in a pivoting manner, and an oil pumping action of the plunger pump 5 is performed by moving up and down the other end of the operation lever 4 whose one end is inserted and fixed in the supporting arm 4A. A pair of pivot shaft mounting portions 22 and 22 is fixed separately from each other on a lower surface of the base 21 of the opening and closing apparatus 20, and circular holes into which a shaft pin 23 is inserted are formed on both the pivot shaft mounting portions 22 and 22 on a coaxial line.

Next, in the above embodiment, an action of opening the manhole cover 3 to open the opening portion 1A of the supporting frame 1 from a normal state shown in FIG. 1 and FIG. 2 in which the opening portion 1A has been closed by fitting the manhole cover 3 in the opening portion 1A of the supporting frame 1 to a state shown in FIG. 7 to FIG. 10 in which a person can come in and out of the manhole will be explained below.

First, a closing plate 24 closing an upper portion of a recessed portion provided near the rotational joining portion 2 of the supporting frame 1 is removed by rotating a nut 24A attached rotatably and unescapably on the closing plate 24 to unscrew the same from a bolt 25 mounted on a bottom plate 27 in the recessed portion, and an outer frame plate 26 including a bearing portion 26A for jack mounting is provided on an upper opening portion of the recessed portion. Since a coupler portion 26B integrated with the bearing portion 26A attached rotatably and unescapably is projected on a lower surface of the outer frame plate 26, the outer frame plate 26 is fixed on the supporting frame 1 by rotating the bearing portion 26A to screw the coupler portion 26B into the bolt 25.

Next, the pair of pivot shaft mounting portions 22 and 22 fixed on a lower surface of the base 21 of the opening and closing apparatus 20 is combined with the bearing portion 26A of the outer frame plate 26, and the shaft pin 23 is inserted into both of the pivot shaft mounting portion 22 and 22 and the bearing portion 26A so that the opening and closing apparatus 20 is rotatably attached to the outer frame plate 26. On the other hand, in the manhole cover 3, a bolt 3A attached at a position adjacent to the closing plate 24 provided on the supporting frame 1 is removed, and an engagement member (eyebolt) 9 is screwed and fixed on a bolt hole for the bolt 3A. Then, a hook at a lower end of the pulling member 10 fixed on the coupling member 10A at the upper end of the ram 6 of the hydraulic jack 7 is caught on the eyebolt 9 fixed on the manhole cover 3 to connect the opening and closing apparatus 20 to the manhole cover 3, so that the opening and closing apparatus 20 is set to a state shown in FIG. 3 to FIG. 7.

Here, after the opening and closing apparatus 20 is set to the state shown in FIG. 3 to FIG. 7, the other end of the operation lever 4 one end of which is inserted into the supporting arm 4A of the plunger pump 5 of the opening and closing apparatus 20 is manually operated up and down. That is, by moving the plunger 5A upward, hydraulic oil is sucked from a tank 7A into an oil chamber 5B of the plunger pump 5 via the tank port 11 and the check valve 12, while by moving the plunger 5A downward, pressure oil in the oil chamber 5B is injected under pressure into a pressure oil chamber 6A on the side of the ram 6 via a pressure oil port 13 to push up the ram 6 and the coupling member 10A, so that the manhole cover 3 is pulled up via the pulling member 10 fixed on the coupling member 10A and the eyebolt 9 fixed on the manhole cover 3. As a result, the manhole cover 3 is rotated about the rotational joining portion 2 in an opening direction (leftward) from the state shown in FIG. 7 to the state shown in FIG. 8.

At this time, since an outer peripheral surface of the manhole cover 3 closing the opening portion 1A of the supporting frame 1 comprises a vertical surface extending downwardly from its upper end to a predetermined depth and an inclined surface positioned below the vertical surface and inclined inward like the inner peripheral surface of the peripheral wall portion 1B of the supporting frame 1, galling does not occur between the outer peripheral surface of the manhole cover 3 and the inner peripheral surface of the vertically-standing peripheral wall portion 1B of the supporting frame 1 when the manhole cover 3 rotates about the rotational joining portion 2 in the opening direction, so that the manhole cover rotates smoothly.

Figure 8:
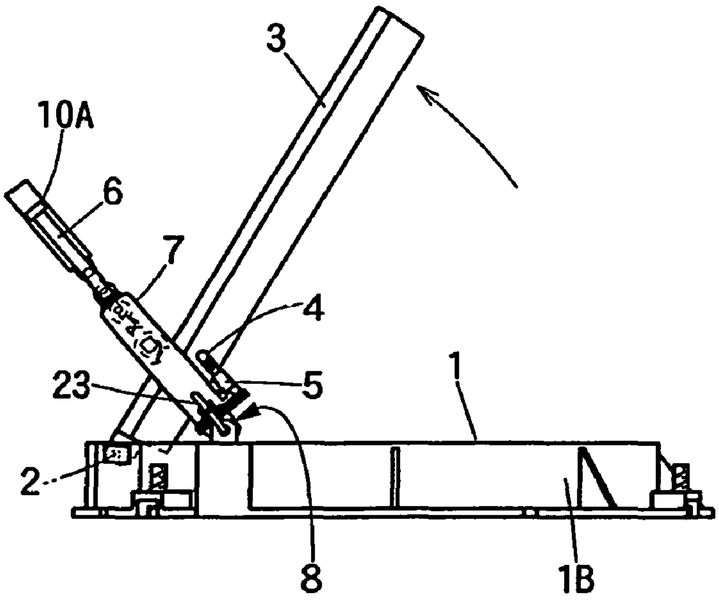
PRIOR ART FIG.8
FIG. 8 is a front view of a first step showing a function of the opening and closing apparatus.
Figure 9:
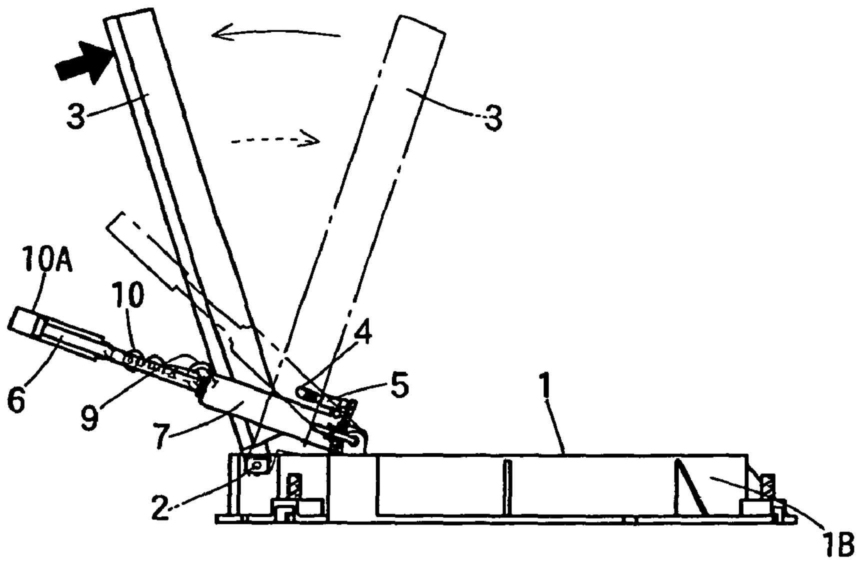
FIG. 9 is a front view of a second step showing the function of the opening and closing apparatus.

Further, when reciprocating movement performed by operating the operation lever 4 manually is continued, the manhole cover 3, the hydraulic jack 7, and the like are rotationally moved from the state shown in FIG. 8 to a state shown by dashed line in FIG. 9 and further up to a state shown by solid line in FIG. 9. That is, since the ram 6 of the hydraulic jack 7, the coupling member 10A, and the pulling member 10 is moved upward respectively, the opening and closing apparatus 20 of the hydraulic jack 7 and the like on the base 21 is rotated about the shaft pin 23 in the same direction as the manhole cover 3 to be inclined, and finally, as shown in FIG. 9 and FIG. 10, the manhole cover 3 can be opened up to an angle of about 100 degrees.

Figure 7:
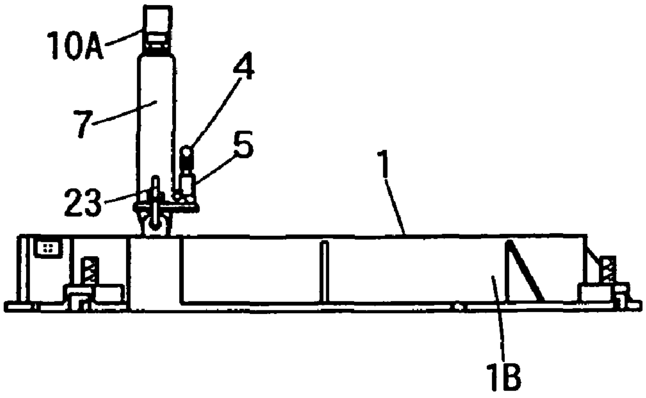
FIG. 7 is a front view of a state in which the opening and closing apparatus has been installed.
Figure 10:
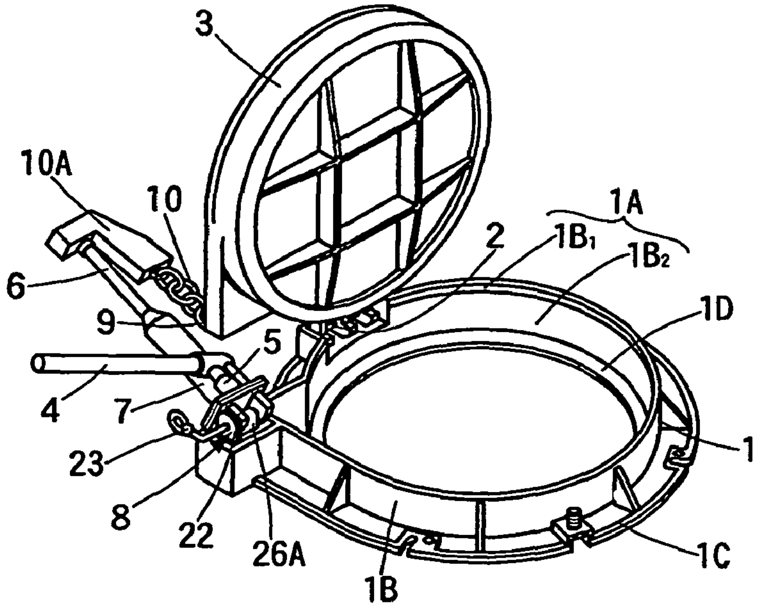
PRIOR ART FIG.10
FIG. 10 is a perspective view of a final step showing function of the opening and closing apparatus.
Figure 11:
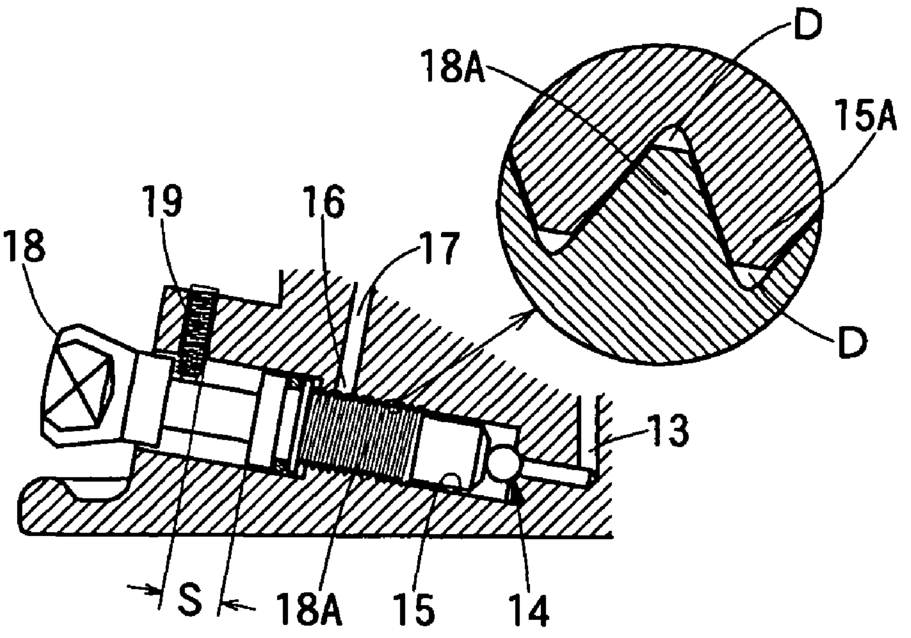
FIG. 11 is a sectional view of the opening and closing apparatus at a closing time of an oil returning valve.
Figure 12:
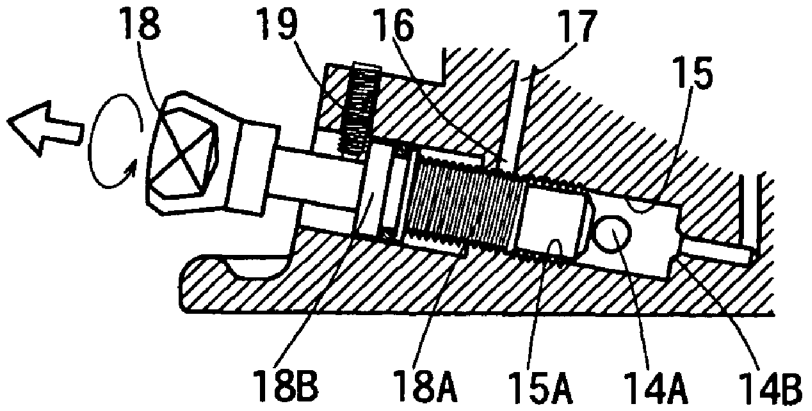
FIG. 12 is a sectional view of the opening and closing apparatus at a releasing time of the oil returning valve.
Figure 13:
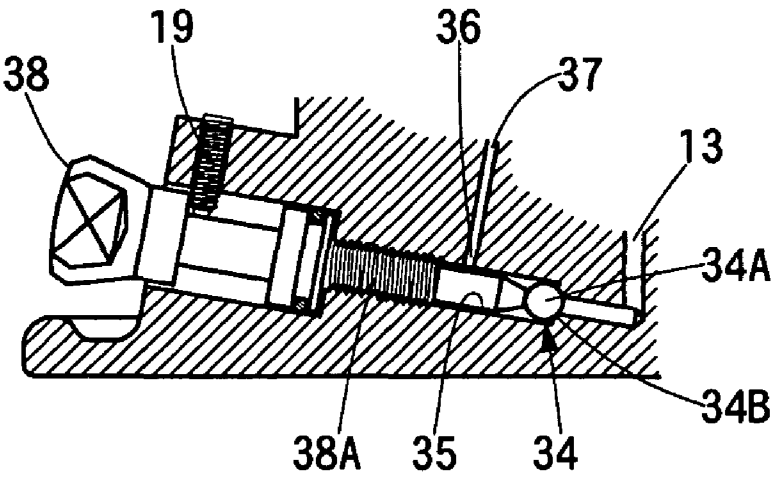
FIG.13(PRIOR ART)
FIG. 13 is a sectional view of a conventional opening and closing apparatus at a closing time of an oil returning valve.
Figure 14:
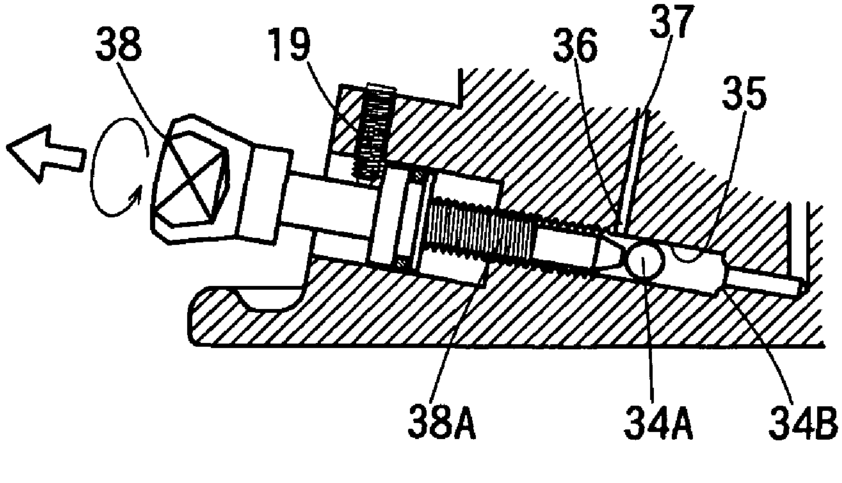
FIG.14(PRIOR ART)
FIG. 14 is a sectional view of the conventional opening and closing apparatus at a releasing time of the oil returning valve.

Next, when the manhole cover 3 in a state shown in FIG. 9 and FIG. 10 which has been opened up to an angle of about 100 degrees is rotationally moved sequentially to the state shown by dashed line in FIG. 9, to the state shown in FIG. 8, and further up to the state shown in FIG. 7 to close the opening portion 1A of the supporting frame 1, a screw valve 18 in a screw valve chamber 15 is first rotated to be retreated from a state shown in FIG. 11 to a state shown in FIG. 12, specifically, to a retreating position in an advancing and retreating stroke range S of the screw valve at which a flange portion 18B of the screw valve 18 abuts against a stopper 19 to release an oil returning valve 14, so that pressure oil in the pressure oil chamber 6A of the hydraulic jack 7 is returned back to the tank 7A through a returning path extending through the oil returning valve 14, the screw valve chamber 15, an opening portion 16, and a return port 17.

That is, when the hydraulic jack 7 is driven, a distal end of the screw valve 18 brings a ball 14A in pressure contact with a seat surface 14B so that the oil returning valve 14 is closed. When the oil returning valve 14 is released, the screw valve 18 is rotated in a loosening direction, and the screw valve 18 is moved (leftward in FIG. 12) along the inside of the screw valve chamber 15, so that the ball 14A is separated from the seat surface 14B. By releasing the oil returning valve 14, the hydraulic oil in the pressure oil chamber 6A on the side of the ram 6 is returned to the tank 7A through the pressure oil port 13, the oil returning valve 14, the screw valve chamber 15, the opening portion 16, and the return port 17, but, in order to prevent the pressurized hydraulic oil on the side of the ram 6 from returning to the tank 7A rapidly, a returning path provided with a manhole cover rotation rate adjusting mechanism configured in the following manner is provided.

As a first embodiment, such a configuration that the opening portion 16 of the return port 17 continuing into the screw valve chamber 15 in the screw valve chamber 15, the opening portion 16, and the return port 17 in the course of the returning path is formed on peripheral walls in the advancing and retreating stroke range S of the screw valve 18 provided so as to be capable of advancing and retreating within the screw valve chamber 15 is adopted. Thereby, hydraulic oil flowing into the screw valve chamber 15 through the released oil returning valve 14 always reaches the opening portion 16 through a space between a female screw portion 15A formed on an inner peripheral surface of the screw valve chamber 15 and a male screw portion 18A formed on an outer peripheral surface of the screw valve 18, that is, a helically rounding detour orifice (peripheral groove) D between the male screw portion 18A of the screw valve 18 provided so as to be capable of advancing and retreating within the screw valve chamber 15 and the female screw portion 15A of the screw valve chamber 15, and flows out from the opening portion 16 to the return port 17. In this way, the helically winding groove hole of the detour orifice is exposed only to the opening portion of the screw valve chamber throughout operation of the rotating adjusting mechanism.

In this manner, in the screw valve chamber 15 in the course of the returning path, since a path through which hydraulic oil reaches the opening portion 16 is the helically rounding detour orifice D, the length of the whole path is elongated in a limited space, or fluid resistance is enlarged by changing the size, the shape, or the like of the space D at a screwing time of the male screw portion 18A of the screw valve 18 into the female screw portion 15A of the screw valve chamber 15, so that it becomes possible to set a returning amount per unit time and a returning time of hydraulic oil returning to the tank 7A. Thereby, rapid closing action of the manhole cover 3 during releasing the oil returning valve 14 can be prevented, and adjusting a closing action time becomes possible. Incidentally, the length of the detour orifice D can also be elongated by enlarging diameters of the male screw portion 18A and the female screw portion 15A or reducing a pitch of both the screw portions 15A and 18A.

According to the present invention, an opening and closing apparatus of a manhole cover in which the number of parts is not increased and clogging does not occur can be provided inexpensively. Further, since fitting portions of the supporting frame and the manhole cover comprises the vertical surfaces and the inclined surfaces, respectively, galling of the manhole cover with the supporting frame at an opening and closing time of the manhole cover does not occur so that the manhole cover rotates smoothly, and since a packing is attached on the inclined surface so that water cutoff performance is ensured, sealing effect is improved.

What is claimed is:

1. An opening and closing apparatus of a manhole cover that is rotatably attached to an opening portion of a supporting frame via a rotational joining portion, the apparatus comprising a hydraulic jack where a ram is raised by reciprocating movement of a plunger and lowered by release of an oil returning valve is installed at the supporting frame positioned near the rotational joining portion such that the hydraulic jack is rotatable and is attachable and detachable at a lower end thereof, an upper end portion of the ram of the hydraulic jack and an engagement member provided on the manhole cover are coupled to each other by a pulling member, and the manhole cover is rotated about the rotational joining portion by moving the ram of the hydraulic jack up and down so that the opening portion of the supporting frame is opened and closed, wherein when the opening portion of the supporting frame is closed, the manhole cover is slowly rotated by a rotating rate adjusting mechanism, the rotating rate adjusting mechanism comprising a detour orifice for adjusting a returning flow rate of hydraulic oil that is provided in an oil returning path through which hydraulic oil within a hydraulic pressure chamber returns to a tank at a load-lowering time of the ram, and the detour orifice for adjusting the returning flow rate of hydraulic oil comprises a helically rounding groove hole formed between an inner peripheral surface of a female screw portion of a screw valve chamber communicating with the oil returning valve and an outer peripheral surface of a male screw portion of a screw valve provided so as to advance in and retreat from the screw valve chamber so that hydraulic oil reaches an opening portion of the screw valve chamber through the detour orifice and returns from the opening portion of the screw valve chamber to the tank through a return port, the opening portion of the screw valve chamber being directly adjacent the helically winding groove hole of the detour orifice when hydraulic oil is returned through the return port, the screw valve advancing in and retreating from the screw valve chamber therealong a defined advancing and retreating stroke range in the screw valve chamber along an axis of the screw valve that is collinear with an axis of the stroke range during travel of the screw valve throughout the stroke range, the stroke range being defined at least between a flange of the screw valve and a stopper interposed in the screw valve chamber, the flange of the screw valve being adapted to abut the stopper and the helically winding groove hole of the detour orifice being exposed only to the opening portion of the screw valve chamber throughout operation of the rotating adjusting mechanism so that the helically winding groove hole of the detour orifice is in continuous, direct communication with the opening portion of the screw valve chamber and the opening portion of the screw valve chamber is directly adjacent the helically winding groove hole of the detour orifice so that the helically winding groove hole of the detour orifice is exposed only to the opening portion of the screw valve chamber throughout travel of the screw valve along the stroke range including an interval in time at which the flange of the screw valve approaches abutment with the stopper and abuts the stopper, a time of abutment of the flange of the screw valve against the stopper indicating a time at which oil return through the opening portion of the screw valve chamber to the tank through the return port is maximized and the manhole cover is closed.

2. The opening and closing apparatus of the manhole cover according to claim 1, wherein the length of the detour orifice for adjusting the returning flow rate of hydraulic oil is set according to the pitch sizes of the male screw portion of the screw valve and the female screw portion of the screw valve chamber or the diameters thereof, and the returning flow rate of hydraulic oil is adjusted according to the set length of the detour orifice.

3. The opening and closing apparatus of the manhole cover according to claim 1, wherein the size of the detour orifice for adjusting the returning flow rate of hydraulic oil is set according to the size of a space between the male screw portion of the screw valve and the female screw portion of the screw valve chamber, and the returning flow rate of hydraulic oil is adjusted according to the set size of the detour orifice.

4. The opening and closing apparatus of the manhole cover according to claim 1, wherein the opening portion of the screw valve chamber is formed on a peripheral wall within the advancing and retreating stroke range of the screw valve provided so as to be capable of advancing and retreating within the screw valve chamber.

5. An opening and closing apparatus of a manhole cover where a manhole cover is rotatably attached to an opening portion of a supporting frame via a rotational joining portion, a hydraulic jack where a ram is raised by reciprocating movement of a plunger and lowered by release of an oil returning valve is installed at the supporting frame positioned near the rotational joining portion such that the hydraulic jack is rotatable and is attachable and detachable at a lower end thereof, an upper end portion of the ram of the hydraulic jack and an engagement member provided on the manhole cover are coupled to each other by a pulling member, and the manhole cover is rotated about the rotational joining portion by moving the ram of the hydraulic jack up and down so that the opening portion of the supporting frame is opened and closed, wherein when the opening portion of the supporting frame is closed, the manhole cover is slowly rotated by a rotating rate adjusting mechanism, wherein the rotating rate adjusting mechanism comprises a detour orifice for adjusting by rotating a screw valve in a screw valve chamber to retreat the screw valve and release the oil returning valve a returning flow rate of hydraulic oil that is provided in an oil returning path that extends through the oil returning valve, the screw valve chamber, an opening portion of the screw valve chamber and a return port and through which hydraulic oil within a hydraulic pressure chamber returns to a tank at a load-lowering time of the ram, and the detour orifice for adjusting a returning flow rate of hydraulic oil comprises a helically rounding groove hole formed between an inner peripheral surface of a female screw portion of the screw valve chamber communicating with the oil returning valve and an outer peripheral surface of a male screw portion of the screw valve provided so as to advance in and retreat from the screw valve chamber, so that hydraulic oil reaches the opening portion of the screw valve chamber through the detour orifice and returns from the opening portion to the tank through the return port.

6. The opening and closing apparatus of the manhole cover according to claim 5, wherein the length of the detour orifice for adjusting the returning flow rate of hydraulic oil is set according to the pitch sizes of the male screw portion of the screw valve and the female screw portion of the screw valve chamber or the diameters thereof, and the returning flow rate of hydraulic oil is adjusted according to the set length of the detour orifice.

7. The opening and closing apparatus of the manhole cover according to claim 5, wherein the size of the detour orifice for adjusting the returning flow rate of hydraulic oil is set according to the size of a space between the male screw portion of the screw valve and the female screw portion of the screw valve chamber, and the returning flow rate of hydraulic oil is adjusted according to the set size of the detour orifice.

8. The opening and closing apparatus of the manhole cover according to claim 6 or 7, wherein the opening portion of the screw valve chamber is formed on a peripheral wall within an advancing and retreating stroke range of the screw valve provided so as to be capable of advancing and retreating within the screw valve chamber.

* * * * *